F. E. RICKETTS.
ARC EXTINGUISHER.
APPLICATION FILED DEC. 7, 1912.
1,201,218.
Patented Oct. 10, 1916.
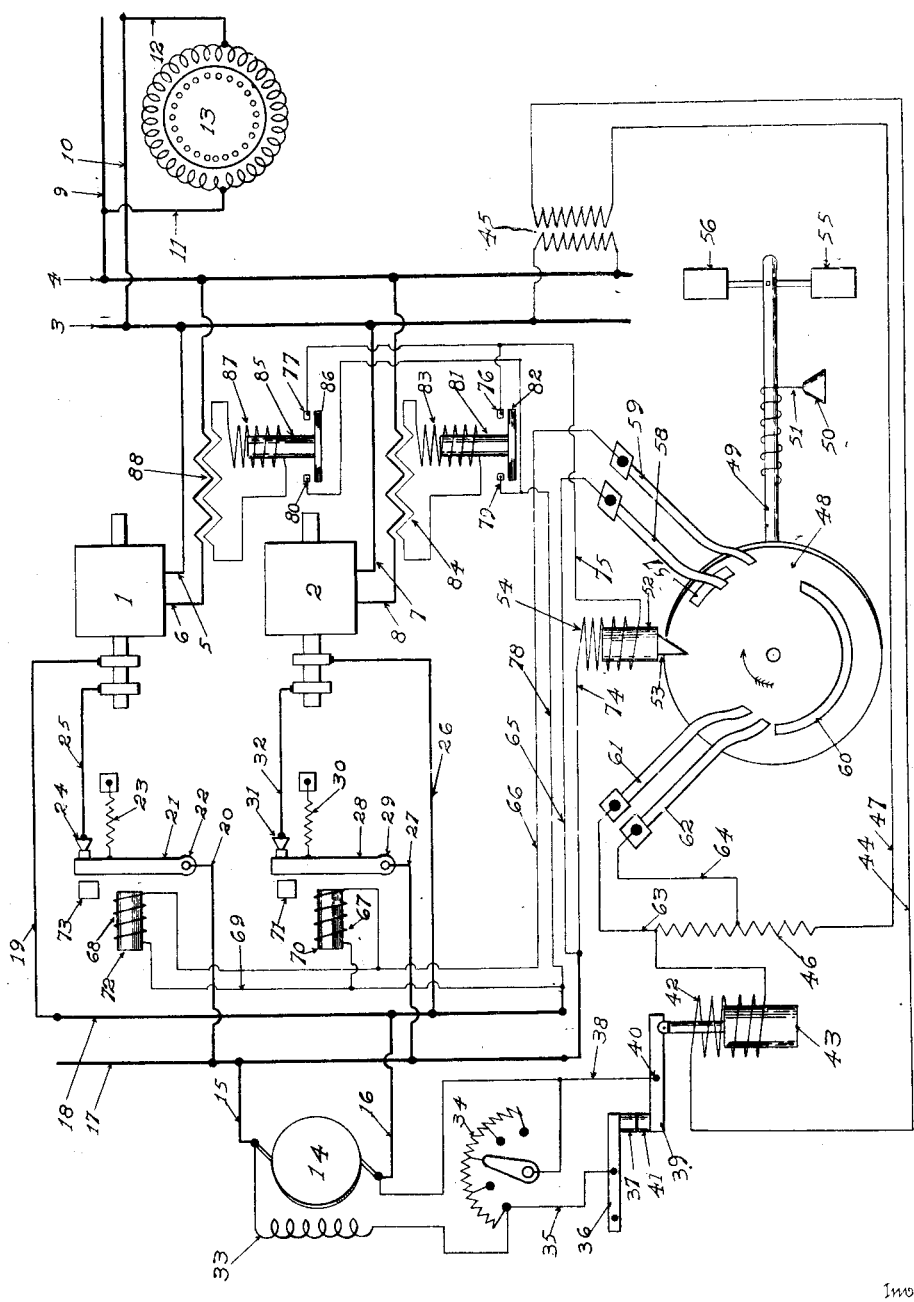
Inventor
Forrest E. Ricketts.
Witnesses
Richard A. Lang
Grover Cleveland Campbell

UNITED STATES PATENT OFFICE.

FORREST E. RICKETTS, OF BALTIMORE, MARYLAND.

ARC-EXTINGUISHER.

1,201,218.  Specification of Letters Patent.  Patented Oct. 10, 1916.

Application filed December 7, 1912. Serial No. 735,376.

*To all whom it may concern:*

Be it known that I, FORREST E. RICKETTS, a citizen of the United States, residing in the city of Baltimore and State of Maryland, have invented a new and useful Arc-Extinguisher, of which the following is a specification.

The present invention relates to apparatus for extinguishing arcs on electric circuits without disconnecting the affected circuit from the electric system from which it is supplied with power.

In accordance with my invention, apparatus is provided for reducing the excitation of a generator when the electric current in the armature circuit of the generator exceeds a predetermined maximum value.

In the preferred embodiment of the device illustrated, automatic switches are provided for the field circuits of the generators, and automatic relays are arranged in the armature circuits of the generators for opening the field switches for a few seconds when the armature current exceeds a predetermined value.

In the diagram, generators Nos. 1 and 2, which are shown as being of the rotating-field type, supply power to buses 3 and 4 through leads 5 and 6 and 7 and 8, respectively. Conductors 9 and 10 connect to the buses 3 and 4 and form a distributing feeder which may be of overhead construction. From the conductors 9 and 10, conductors 11 and 12 lead to a motor 13 which may be of the induction type.

For exciting the field coils of the generators, an exciter 14 is provided. From the terminals of the exciter 14, conductors 15 and 16 lead to conductors 17 and 18, which form a field bus for the generators 1 and 2. The conductor 18 is connected to one terminal of the field coil of generator 1 by a conductor 19, and the conductor 17 is connected by a conductor 20 to a switch lever 21, pivoted at 22. A spring 23 holds the lever 21 against a contact member 24, which is connected by a conductor 25 to the other terminal of the field coil of the generator 1. Also, a conductor 26 connects the conductor 18 to one terminal of the field coil of the generator 2, and a conductor 27 leads from the conductor 17 to a switch lever 28, pivoted at 29. A spring 30 holds the lever 28 against a contact member 31, which is connected, by a conductor 32, to the other terminal of the field coil of the generator 2.

The exciter 14 has a field coil 33 which is connected in series with an adjustable rheostat 34 across the armature terminals of the exciter 14. The rheostat is for controlling the voltage of the exciter and thereby controlling the field current supplied to the generators 1 and 2 which, in turn, control the voltage impressed on the mains 3 and 4.

From one terminal of the rheostat 34 a conductor 35 leads to a lever 36 which carries a contact member 37, and a conductor 38 leads from the other terminal of the rheostat 34 to a lever 39, pivoted at 40, and carrying a contact member 41. The lever 39 is moved about its pivot by the action of a solenoid 42 on an iron core 43 which is attached to the lever 39 at the end remote from the contact member 41. One terminal of the solenoid 42 is connected by a conductor 44 to one terminal of a voltage transformer 45, the primary of which is connected across mains 3 and 4, while the other terminal of the solenoid is connected, through a resistance element 46 and a conductor 47, to the other terminal of the transformer. The resistance element 46 is such that, with normal voltage on mains 3 and 4, just sufficient current will flow through the solenoid 42 to maintain the contact member 41 just at the point of contact with the contact member 37.

A disk 48 made of insulating material, preferably hard rubber, is mounted on a shaft 49. A weight 50 is attached to the shaft 49 by means of a cord 51 which is so wound around the shaft as to tend to rotate the disk in the direction indicated by the arrow. An iron core 52 is provided with a projecting portion 53 and is normally attracted by gravity into a notch formed in the disk 48, thereby preventing the disk from rotating. A coil 54 is so placed relative to the iron core 52 that, when current flows through the coil, the iron core is lifted against gravity, and the weight 50 will be acted upon by gravity to cause the disk to rotate in the direction indicated by the arrow. Metal vanes 55 and 56 are attached to the shaft 49 in such a way that the friction of the air tends to retard the rotation of the disk and, in the present description, we will consider that this retardation is just sufficient to regulate the speed of the disk to one revolution in sixty (60) seconds.

On the surface of the disk 48 is a metal conductor 57, so placed relative to two metal fingers 58 and 59, that, a few seconds after the disk starts to rotate, the conductor 57 will form electrical connection between the fingers 58 and 59, which connection will continue for a few, say five (5), seconds. A second conductor 60 is attached to the surface of the disk 48 and so related to two metal fingers 61 and 62 that, a few seconds after the disk starts to rotate, electric connection will be formed between the fingers 61 and 62, which connection will continue for say thirty (30) seconds. The metal finger 61 is connected through a lead 63 to one terminal of the resistance element 46, and a conductor 64 connects the metal finger 62 with an intermediate point of the resistance element 46, say the middle point. The metal finger 58 is connected by a conductor 65 to the exciter bus 17, and the metal finger 59 is connected through a conductor 66 to one terminal of each of two solenoids 67 and 68; the other terminals of the solenoids 67 and 68 being connected through a conductor 69 to the exciter bus 18. The solenoid 67 has an iron core 70, which, when an electric current is passed through the solenoid 67, becomes energized and attracts the iron switch lever 28 against a stop 71, thereby interrupting the field circuit of the generator 2. Likewise, the solenoid 68 has an iron core 72, which, when energized by current flowing in the solenoid 68, attracts the iron lever 21 against a stop 73 and thereby interrupts the field circuit of the generator 1.

One terminal of the solenoid 54 is connected through a conductor 74 to the exciter bus 17, and, from the other terminal of the coil 54, a conductor 75 leads to contact members 76 and 77. From the exciter bus 18, a conductor 78 leads to two contact members 79 and 80. An iron core 81 carries a bridging contact member 82 and is so related to the contact members 76 and 79 that, when the force of gravity is overcome by the influence of a solenoid 83 on the iron core, electrical connection between the contact members 76 and 79 is made by the contact member 82. The solenoid 83 is connected across the secondary of a current transformer 84, while the primary of the transformer 84 is in series with the conductor 8, which constitutes one lead of the armature circuit of the generator 2. Therefore, when the current in the armature circuit of the generator 2 reaches a value sufficient to energize the solenoid 83 and to lift core 81 to complete circuit between contacts 76 and 79, current will flow from the bus 18 along the conductor 78 through contact members 79, 82 and 76 to the conductor 75 and then through the solenoid 54 and the conductor 74 to the exciter bus 17. This current passing through the solenoid 54 will lift the core member 52 and allow the disk to rotate under the influence of the weight 50. Similarly, the core 85 is arranged for completing connection through a bridging contact member 86 between contact members 77 and 80, when the current in a solenoid 87 reaches a value sufficient to lift the core 85 against gravity. For supplying current to the solenoid 87, its terminals are connected to the secondary terminals of a current transformer, while the primary of the current transformer is connected in series with conductor 6, which constitutes one lead of the armature circuit of the generator 1. The function of the solenoid 87, with its action on the core 85, is the same with respect to the generator 1 as the solenoid 83, with its action on the core 81, is to the generator 2.

When the system illustrated is in normal operation, the contact member 41 is moved into and out of contact with the contact member 37 by the influence of the coil 42 on the core 43, at intervals sufficient to maintain the voltage on the exciter mains 17 and 18 at the value required to maintain normal voltage on the mains 3 and 4. At the same time, the disk 48 is held in the position shown in the drawing by the magnet core 52. The cores of the magnets 81 and 85 are of such weight that at least 200 per cent. normal current will be required in the armature circuits of the generators 1 and 2 to lift the cores and effect engagement between the contact members controlled thereby.

Under the above conditions, we will assume that an electric arc is established between the conductors 9 and 10, which will cause the current in the leads 6 and 8 to increase to a value sufficient to cause the solenoids 83 and 87 to lift their cores and close the circuit between conductors 75 and 78, allowing current to flow from the exciter bus 18 through the coil 54 and back to the exciter bus 17. This current flowing through the coil 54 will cause the core 52 to release the disk 48 which will begin to rotate in the direction indicated by the arrow, and the conductor 57, passing under the fingers 58 and 59, will complete the circuit between the exciter buses 17 and 18 through the coils 67 and 68, which, in turn, will energize the cores 70 and 72 and cause the switch levers 21 and 28 to move away from the contacts 24 and 31, respectively, thereby interrupting the field circuits of generators 1 and 2. As a result, the voltage on the conductors 9 and 10 will decrease sufficiently to cause the arc between the conductors 9 and 10 to break without disconnecting them from the armature circuit of the generators 1 and 2. A few seconds after the disk 48 has started to rotate, the conductor 57 will have passed from under the fingers 58 and 59, thereby interrupting the circuit through the coils 67 and 68 which will allow the springs 23 and 36 to pull the levers 21 and 28 against the contacts 24 and 31, thereby reëstablishing the field circuits of generators 1 and 2.

While the field circuits of the generators are interrupted, the generators may have pulled out of synchronism. While the voltage on the armature circuits of the generators is below normal, the coil 42 allows the core 43 to drop and effect engagement between the contact members 41 and 37, which increases the voltage of the exciter 14 so that, when the field circuits of the generators are restored, they will have a very strong field, which will be very effective in resynchronizing the generators. If, however, these strong fields are left on the generators after they are again in synchronism, the voltages will rise more rapidly than the counter-electromotive forces generated by the motors, such as the motor 13, and, therefore, the motors will take an excessive current. But, by the time the fields of the generators are restored, the conductor 60 on the disk 48 will have passed under fingers 61 and 62 and short-circuited one-half of the resistance element 46, which will make the contact member 41 respond to one-half normal voltage on the armature circuits of the generators. Therefore, when the field circuits of the generators are restored, the generators will have very strong fields until they have been synchronized and their voltages have reached one-half normal value. As a result, the contact member 41 will operate to maintain one-half voltage on the armature circuits of the generators until the contact member 60 has passed from under the fingers 61 and 62, by which time the motors, such as the motor 13, will have reached normal speed. Since all of the resistance element 46 is now in circuit, the contact member 41 will again operate to maintain normal voltage on the armature circuits of the generators. The disk 48 will continue to rotate until it has made one complete revolution, when the projection 53 will drop into the disk notch and thus stop the disk because the currents in the armature circuits of the generators will have decreased below the value necessary to lift the cores 81 and 85 and, therefore, the coil 54 will no longer be energized. The system will now be restored to normal operation without having interrupted any of the service, as would have been the case if the voltage on the armature circuits of the generators had been maintained at normal and the conductors 9 and 10 disconnected from the mains 3 and 4, as has been the practice in the past.

Having thus described my invention, I do not limit myself to the detail shown, but claim and desire to secure by Letters Patent:

1. In an electrical distribution system, the combination with a dynamo-electric machine, of means for reducing the voltage of the machine substantially to zero when a short circuit occurs on the system and for automatically restoring the voltage before the apparatus connected to the system falls out of synchronism with the dynamo-electric machine.

2. In an electrical distributing system, for interrupting an arc between conductors of the system; means for reducing the voltage of the entire system substantially to zero, and then automatically restoring the voltage of the entire system substantially to normal; and means for preventing a second reduction in voltage for a predetermined time.

3. The combination with a series transformer in an alternating current system of distribution, of a circuit breaker in the exciter system, means responsive to the current traversing the series transformer for opening the circuit breaker, means for closing the circuit breaker and means for preventing the re-opening of the circuit breaker for a definite time.

4. In a system of electrical distribution, a supply circuit, a load circuit, a plurality of generators furnishing power to the supply circuit, a circuit breaker for interrupting each of the field circuits of the generators, means responsive to the current flow in the supply circuit for simultaneously opening and closing all of the said circuit breakers, and for controlling the frequency of operation of the said circuit breakers.

5. In an electrical distributing system for interrupting arcs between conductors of the system; means for reducing the voltage of the entire system substantially to zero, and then, after a predetermined time, automatically restoring the voltage of the entire system substantially to normal; and means for preventing a second reduction in voltage for a predetermined time.

6. In an electrical distributing system; means for reducing the voltage of the entire system for a predetermined time; means for restoring the voltage of the entire system substantially to normal; and means for preventing a second reduction in voltage for a predetermined time.

7. In an electrical distributing system; a generator having an armature circuit and a field circuit, means responsive to the current in the armature circuit for opening the field circuit for a predetermined time, means for closing the field circuit, and means for preventing the first named means from opening the field circuit for a predetermined time.

8. In an electrical distributing system for interrupting arcs between conductors of the system; means for reducing the voltage of the entire system for a predetermined time, and then automatically restoring the voltage substantially to normal, and means for controlling the rate at which the voltage is restored.

9. In an alternating-current distributing system, the combination with means for reducing the voltage of the entire system when an arc obtains thereon, of means for restoring the voltage of the entire system substantially to normal before the apparatus connected thereto falls out of synchronism.

10. An electrical distribution system comprising means for automatically reducing and restoring the voltage of the system to extinguish an arc thereon, the time between the reduction and restoration of the voltage being such that the connected load will operate without interruption.

11. An arc-extinguishing means for a system of distribution comprising means for reducing the voltage on the system and means for restoring the voltage on the system with sufficient promptness to prevent the load on the system from falling out of synchronism.

12. An arc-extinguishing means for a system of distribution comprising means for alternately reducing the voltage of the system to substantially zero and restoring the voltage to substantially normal while an arc obtains thereon.

In testimony that I claim the foregoing as my own, I have hereto affixed my signature in the presence of two witnesses.

FORREST E. RICKETTS.

Witnesses:
 JOHN T. FARDY,
 WM. M. WURTZBURGER.